July 4, 1950 S. IANDIORIO 2,514,243
AUTOMOBILE SKID CHAIN
Filed March 4, 1949
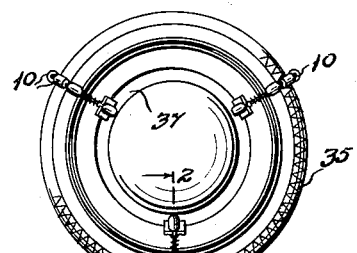
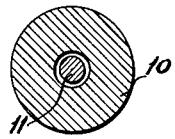
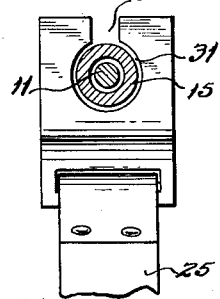
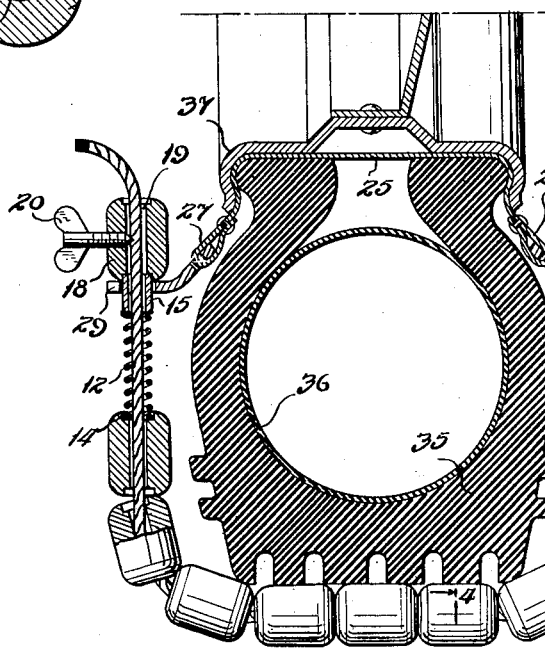
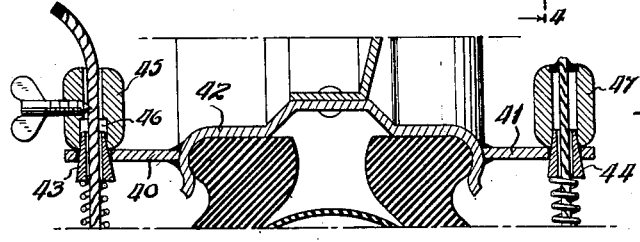
INVENTOR
Sam Iandiorio
BY
P. Stephen Baker
ATTORNEY Patented July 4, 1950

2,514,243

UNITED STATES PATENT OFFICE 2,514,243

AUTOMOBILE SKID CHAIN

Sam Iandiorio, Woodhaven, N. Y., assignor of thirty-three and one-third per cent to Joseph Marchese and thirty-three and one-third per cent to Milton Guttman, both of Brooklyn, N. Y.

Application March 4, 1949, Serial No. 79,577

15 Claims. (Cl. 152—222)

This invention relates to automobile skid chains.

The problems involved in employing skid chains for automobile tires are varied. One of these problems is that of facilitating the connection of the skid chain to the tire as required. In general, the operator of an automobile finds mechanical tasks of this nature quite difficult. A second problem is the fact that skid chains are subjected to severe strains and wear and often break pursuant thereto. If a skid chain is broken during use, it generally becomes completely inoperative and the loose ends may further occasion damage to other parts of the automobile body.

The present invention attacks the above problem by providing a skid chain which can be applied with a minimum of complexity. A portion of the skid chain may remain in place adjacent the tire at all times while the effective or ground gripping section can be very simply connected to the permanently attached portion. The skid chain further includes a series of rollers or the like which are strung or otherwise mounted on a strong wire or cable. If one of these rollers should wear out, the skid chain nevertheless remains in substantially the same form without coming apart. In fact, means are provided to maintain the rollers in proper position even if one or more of them should break or become lost. Such means takes the form of a spring which compacts the rollers together so that if one or two are lost, the remaining rollers still maintain the proper front for gripping of the ground surface.

The invention will be further understood from the following description and drawings in which:

Fig. 1 is a front elevational view of a tire provided with three independent skid chains constructed according to the instant invention.

Fig. 2 is an enlarged sectional view taken substantially along the lines 2—2 of Fig. 1.

Fig. 3 is a fragmentary view of the end of the permanent connector as it embraces the skid chain.

Fig. 4 is a section substantially along the lines 4—4 of Fig. 2.

Fig. 5 is a fragmentary view illustrating a modified embodiment.

In the form shown, the skid chain of the instant invention comprises independent units, a plurality of which may be applied around the tire as illustrated in Fig. 1. It consists of a series of cylindrical rollers 10 supported around a wire cable 11. Generally, more rollers 10 than actually required will be strung on the cable 11 because the additional rollers will become disposed at the sides of the tires as illustrated in Fig. 2, but will be urged toward the center should a roller break, as will be hereinafter described. Wire cable 11 may be fabricated of steel stranded cable of approximately ¼ inch diameter so as to be extremely sturdy and of great strength. Accordingly, the device is substantially assured against breaking in such a way as to cause the skid chain to hang from its mountings and being violently tossed during rotation of the wheels. On the other hand, rollers 10 are preferably but not necessarily of a softer metal, such as aluminum. The purpose thereof is to assure that the rollers will wear out before the cable does. As the rollers wear out, as will be hereinafter described, they are automatically replaced so that the device tends to remain in operative condition.

The rollers 10 are urged towards each other by a pair of coil springs 12 and 13 which may seat in recess 14 formed at the ends of the rollers. The other end of the springs may be connected to a plug 15 which serves as a terminal for the springs. One end of the skid chain has a roller 16 connected to plug 15 and the cable 11 is soldered or otherwise secured at 17 to the outer end of roller 16. This serves merely as an enlargement to prevent accidental disassembly of the skid chain after it has been applied. The other end of the skid chain is provided with a roller 18, the bottom recess of which fits over the plug 15. Cable 11 rides freely within the opening 19 of roller 18, but a set screw 20 is employed to secure the cable to the roller so as to adjust the desired size of the skid chain.

A strap 25 is provided for permanent connection to the wheel. Such strap may be of metal or very strong woven fabric belting. It is terminated in loops 26 and 27 to which are connected angular brackets 28 and 29. Brackets 28 and 29 may be substantially identical in form. Referring to Fig. 3, they are provided with a slot opening 30 and an enlarged central opening 31.

The skid chain as hereinabove described, is utilized as follows:

Strap 25 will be applied when the tire 35 and its tube 36 are initially mounted on rim 37. The loops 26 and 27 as well as the brackets 28 and 29 will remain in the position illustrated in Fig. 2. The skid chain per se may be kept in the luggage compartment of the car during ordinary driving and will be connected to the tire as required. This will be done by pulling back the plugs 15 against the action of the springs and inserting the cable 11 through slot openings 30 and into central opening 31. The plug 15 is then released and substantially fills the rest of the opening 31 so that it cannot escape from the slot 30. When the skid chain is to be removed, the plugs 15 are pulled downwardly and the cables 11 are withdrawn from the slots 30 of brackets 28 and 29 respectively. Accordingly, it will be recognized that the application or removal of the skid chain is a very simple task requiring only insertion of the cable in the slots 30 and snapping of the plugs 15 into the openings 31.

As the car travels, the skid chains will perform their usual function of providing the necessary traction, the rolling action of the cylindrical rollers 10 assisting in this function. The rollers will take up any wear on the skid chain. Such wear will occur not only at their outer road engaging surfaces but at those points where the rollers contact each other. Accordingly, the rollers will in time wear down completely and will fall off the cable 11. The springs 12 and 13 will compact the remainder of the rollers so that no space occurs in that area where the roller came off. It will be seen, therefore, that the rollers will always be urged toward the center of the skid chain so that they will be properly disposed in relation to the tire surface.

If too many rollers are lost, they may be simply replaced by loosening wing nut 20, removing roller 18, removing plug 15 and spring 12 and applying substitute rollers which can be purchased for this purpose. The spring 12 is then returned into place as is the roller 18, and the screw or nut 20 tightened. Spring 12 will be maintained compressed during tightening of the screw 20 so that the rollers are properly compacted or urged together.

The fabrication of rollers 10 of aluminum or the like serves another purpose in that aluminum appears to maintain a rough exterior relative to steel or the like. In other words, it does not become as polished as would steel particularly after long frictional engagement with paved or dirt roads during the use thereof. It has been found that the aluminum becomes pitted or rough in its surface after such use, such surface formation being of advantage in providing traction.

A modified embodiment of the foregoing is illustrated in Fig. 5. In this figure, metal ears 40 and 41 are integrally secured to the rim 42. Such ears remain, then, as a permanent fixture on the rim. The skid chain takes the general form as the one above described, but cylindrical plugs 15 are supplanted by tapered or conical plugs 43 and 44. Roller 45 serves the same function as does roller 18, but its recesses 46 may be enlarged so as to admit the smaller end of plug 43. Roller 47 serves the same function as plug 16 but its recess is also enlarged to admit the smaller end of plug 44. Conical plugs 43 and 44 are pulled downwardly in applying the skid chain in the same manner as plugs 15 and they will also fill the openings 31 so as to prevent accidental disassembly of the skid chain during use.

The cable may be lubricated so as to facilitate proper action of the rollers as well as to assist in rendering it rust-proof, if necessary. Springs 12 and 13 may be approximately of the same diameter as plugs 15, as described, so that the spring itself is larger than the slot opening 30 so as to be locked in opening 31 if the plugs are not used. It will be noted that the skid chain of the instant invention is adaptable to all sizes of tires, a smaller tire requiring less rollers. When strap 25 is fabricated of flexible belting or the like, the locking brackets will have such flexibility of movement as not to become distorted or bent if they strike a curb or the like.

What is claimed is:

1. A skid chain comprising an elongated flexible wire, means to connect the ends of the wire around the exposed surfaces of an automobile tire, a plurality of metal rollers strung on said wire, and spring means for urging said rollers centrally of said wire.

2. A skid chain comprising an elongated flexible wire, means to connect the ends of the wire around the exposed surfaces of an automobile tire, a plurality of metal rollers strung on said wire, and a spring supported on each end of said wire and bearing against the aligned rollers for urging them together toward the central portion of the wire.

3. A skid chain comprising an elongated, flexible metal cable, means to connect the wire around the road contacting surface of an automobile tire, a plurality of cylindrical rollers strung on said wire in alignment, helical springs supported at each end of said cable and bearing against the rollers for urging them together toward the central portion of the cable, said rollers being of a metal which is of softer material than that of the cable.

4. A skid chain according to claim 3 and wherein said cable is fabricated of steel strands and said rollers are fabricated of aluminum.

5. A skid chain comprising an elongated flexible wire, means to connect the ends of the wire around the exposed surfaces of an automobile tire, a plurality of metal rollers strung on said wire, and spring means for urging said rollers centrally of said wire, said rollers being in the form of cylindrical tubes.

6. A skid chain according to claim 5 and including stop members fastened to said wire at each end thereof and maintaining the spring means under compression.

7. A skid chain according to claim 6 and wherein said means to connect the ends of the wire around the exposed surfaces of an automobile tire comprises a strap for insertion between the tire and rim of a wheel, and locking brackets on the ends of said strap for engaging the wire between the spring means and stop members.

8. A skid chain according to claim 7 and wherein said locking brackets have an opening formed therethrough and have an end slot communicating therewith, said spring means comprising a helical spring disposed at each end of and around the wire, said locking bracket openings being of a diameter substantially equal to the diameter of the helical spring so as to admit said spring therethrough, said slot being narrower than said diameter so as to maintain said spring and wire locked in said opening, said wire being of lesser diameter than said slot so as to be releasable through said slot when said spring is withdrawn downwardly along said wire against the normal action thereof so as to be withdrawn from within said opening.

9. A skid chain according to claim 8 and including a pair of lugs connected at each outward end of the springs, said stop members being formed with recesses, said lugs being urged into said recesses through the action of said springs.

10. A skid chain comprising an elongated, flexible cable, a strap for connecting the ends of the cable around the exposed surfaces of an automobile tire, a series of cylindrical metal rollers maintained side by side on said cable, and springs on each side of the series of rollers for maintaining the rollers substantially centrally of said cable, said springs being helical and disposed around said cable, each of said rollers having recesses formed at the ends thereof.

11. A skid chain comprising a flexible strap for insertion between the tire and rim of a wheel, locking brackets at each end of said strap, and a traction member connectable to said locking brackets so as to be disposed around the road engaging surfaces of the tire, said traction member comprising a metal cable, a series of cylindrical rollers disposed around said cable, and spring means operating against at least one of said locking brackets and maintaining said rollers substantially centrally of said cable.

12. A skid chain according to claim 11 and including a cylindrical, tubular stop member releasably connected to said cable and forming a terminal for said spring, said spring being on one side of said locking bracket and said stop member being on the other side thereof, a lug connected to one side of said spring, said locking bracket having an opening formed therethrough, said stop member having a recess formed therein, said lug being urged by said spring through said opening into the recess of said stop member.

13. A skid chain for use with a tire and metal rim combination comprising an elongated, flexible cable for disposition around the exposed surfaces of the tire, a plurality of metal rollers strung on said cable, means urging said rollers centrally of said cable, and means to maintain said cable around said tire, said last named means comprising a pair of projections extending from the rim of said tire and rim combination.

14. A skid chain for use with a tire and metal rim combination comprising a pair of locking brackets adapted to be connected adjacent each side of the rim so as to extend therefrom, said brackets being formed with a central opening and a slot communicating therewith, a traction member connectable to said locking brackets by being inserted in said slots so as to be receivable in said openings, said slots being of lesser width than said openings, and spring actuated locking means maintained on said traction member and receivable in said openings.

15. A skid chain comprising an elongated flexible wire, means to connect the ends of the wire around the exposed surfaces of an automobile tire, and a plurality of cylindrical metal rollers loosely strung on said wire, both ends of each roller being convex and of the same shape as the ends of all the other rollers.

SAM IANDIORIO.

REFERENCES CITED

The following references are of record in the file of this patent:

UNITED STATES PATENTS

| Number | Name | Date |
|---|---|---|
| 1,267,544 | Haubner | May 28, 1918 |
| 1,297,155 | Harrington | Mar. 11, 1919 |